United States Patent
El Mghazli et al.

(10) Patent No.: US 9,379,943 B2
(45) Date of Patent: Jun. 28, 2016

(54) NETWORK SERVICE MANAGER DEVICE USING THE COPS PROTOCOL TO CONFIGURE A VIRTUAL PRIVATE NETWORK

(75) Inventors: Yacine El Mghazli, Arcueil (FR); Damien Galand, Chaville (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1886 days.

(21) Appl. No.: 10/387,407

(22) Filed: Mar. 14, 2003

(65) Prior Publication Data
US 2004/0083298 A1   Apr. 29, 2004

(30) Foreign Application Priority Data
Mar. 15, 2002   (FR) ...................................... 02 03258

(51) Int. Cl.
  *G06F 15/16*   (2006.01)
  *H04L 12/24*   (2006.01)
(52) U.S. Cl.
  CPC .................................. *H04L 41/0893* (2013.01)
(58) Field of Classification Search
  CPC .................................................. H04L 41/0893
  USPC ........................................ 709/223, 203, 226
  See application file for complete search history.

(56) References Cited

U.S. PATENT DOCUMENTS

| | | | |
|---|---|---|---|
| 6,434,624 B1 * | 8/2002 | Gai et al. ...................... | 709/232 |
| 6,611,863 B1 * | 8/2003 | Banginwar .................... | 709/220 |
| 6,886,043 B1 * | 4/2005 | Mauger et al. ................. | 709/238 |
| 6,988,133 B1 * | 1/2006 | Zavalkovsky et al. ......... | 709/223 |
| 7,082,102 B1 * | 7/2006 | Wright .......................... | 370/229 |
| 7,516,198 B1 * | 4/2009 | Appala ................... | H04L 45/02 |
| | | | 707/999.004 |
| 2002/0071427 A1 * | 6/2002 | Schneider et al. ............. | 370/352 |
| 2002/0097732 A1 * | 7/2002 | Worster et al. ................. | 370/408 |
| 2003/0018889 A1 * | 1/2003 | Burnett ............... | H04L 41/0809 |
| | | | 713/153 |

FOREIGN PATENT DOCUMENTS

WO   WO 01 89234   11/2001

OTHER PUBLICATIONS

Chan et al. "COPS Usage for Policy Provisioning (COPS-PR)". RFC 3084. Mar. 2001. pp. 1-33.*
Chan et al: "COPS Usage for Policy Provisioning (COPS-PR)" IETF RFC 3084, Mar. 1, 2001, pp. 1-34, XP002224809.
Durham D et al: "RFC 2748—the COPS (Common Open Policy Service) Protocol" IETF RFC 2748, Jan. 2000, XP002217422.

* cited by examiner

*Primary Examiner* — John MacIlwinen
(74) *Attorney, Agent, or Firm* — Chiesa Shahinian & Giantomasi, PC

(57) ABSTRACT

The invention proposes in particular a network service PDP manager device (6) sending virtual private network configuration information using the COPS-PR protocol. The information comes from a dedicated PIB database and is sent to an edge router (7 to 13).
The invention speeds up recognition of a virtual private network modification and prevents failures due to a lack of configuration information at the router.
The invention also relates to a router (7 to 13), a system using the manager device and the router, and a virtual private network management method.

11 Claims, 1 Drawing Sheet

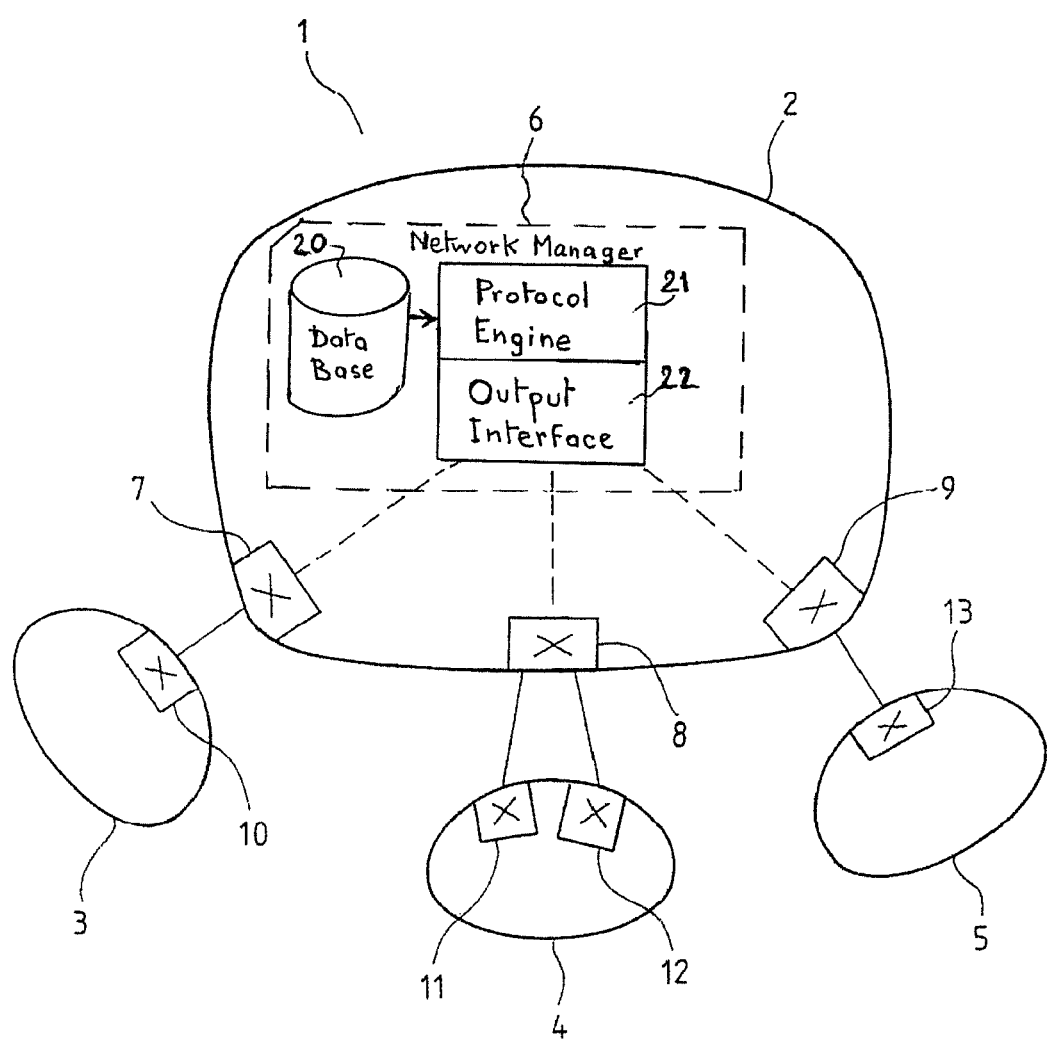

NETWORK SERVICE MANAGER DEVICE USING THE COPS PROTOCOL TO CONFIGURE A VIRTUAL PRIVATE NETWORK

The invention relates to virtual private networks (VPN) and in particular to the components involved in configuring virtual private network services.

Virtual private network applications connect two remote user sites via a service provider network and make the connection via the service provider transparent for users. The recommendation RFC 2547bis defines one virtual private network management mechanism.

The virtual private network is sometimes modified by adding a VPN user site or by modifying sites belonging to the virtual private network. When the virtual private network is modified, a service provider network manager device, also known as a "network manager", is usually used to configure the client or service provider edge routers, using the SNMP, to define the new configuration of the virtual private network. Defining the new configuration of the virtual private network includes sending modifications of an MIB database of the network manager device of an edge router, using the SNMP.

Existing virtual private network manager devices and their methods of operation have drawbacks. Sending a network service configuration to a router conforming to the SNMP has a granularity that is too fine. Accordingly, to install a new configuration in the router, the manager must send a series of parameters. The parameters are installed individually by the router. As a result, if one of the parameters is incorrect, for consistency, all of the parameters that form the configuration must be uninstalled. Moreover, the SNMP offers limited error correction capabilities. In practice this implies a prudent network service management approach, which is to the detriment of performance. Furthermore, edge routers often assign a low priority to SNMP packets. Thus the edge router takes too long to interpret an SNMP packet containing configuration data compared to the required response time. Moreover, sending SNMP configuration packets generates conflicts between different configurations sent by more than one manager to the same edge router.

There is therefore a need for a network service manager device, a router, a system and a method that eliminate one or more of the above drawbacks. The invention therefore provides a network service manager device, including a PIB database containing configuration information for a virtual private network; a protocol engine able to generate COPS-PR format network service management packets containing configuration information extracted from the database; and an output interface for sending packets supplied by the protocol engine.

The invention also provides a virtual private network router, including: an input interface; a protocol engine connected to the input interface and able to process COPS-PR packets received at the input interface; and a PIB database adapted to receive configuration information from the protocol engine.

In one variant, the COPS-PR protocol engine is able to generate COPS-PR protocol packets; it further includes an output interface for sending packets supplied by the COPS-PR protocol engine.

The invention further provides a network service management system, including a service provider network including a device of the above type and a plurality of routers of the above type able to receive packets sent by the device, and disposed at the edge of the provider network.

The invention further provides a virtual private network management method, including the steps of a network service manager device sending configuration information for at least one virtual private network using the COPS-PR protocol; at least one router receiving the information sent; and configuring a receiver router as a function of the information sent.

In one variant, the method further includes a step of storing and interpreting configuration information in a PIB database of a receiver router.

In another variant, the sender manager device is included in a service provider network; and a receiver router is an edge router of the network of the service provider.

In a further variant, the method further includes a step of communication between the receiver router and a router of a client portion of the virtual private network.

In a further variant, the method includes, prior to the step of sending by the manager device, the steps of connecting the router to the manager device; and the router sending configuration information for the router or the virtual private network to which the router belongs using the COPS-PR protocol.

Also, the sender manager device can be included in a service provider network; and a receiver router can be an edge router of a client portion of the virtual private network.

The invention is described in more detail next, with reference to the appended drawing, in which:

FIG. 1 is a diagram showing one example of a network employing virtual private networks.

According to the invention, a network manager device sends routers configuration information for a virtual private network using the COPS-PR protocol.

The COPS protocol is defined in IETF recommendation RFC 2748. It distinguishes data packets as a function of priorities defined in a header of each packet. This protocol provides in particular for managing the quality of service (QoS) as a function of a service level agreement (SLA) entered into with a client. The COPS-PR protocol is defined in IETF recommendation RFC 3084. It is used to send configuration data between a network manager and network elements.

The example described hereinafter corresponds to a network managing the virtual private network in a provider provisioned VPN (PPVPN) mode managed by a service provider. FIG. 1 shows a network 1 including a plurality of virtual private networks. The network includes a service provider network 2 and client sites 3 to 5 connected to the provider network 2. The service provider network 2 includes a centralized network manager device 6, usually referred to as a PDP, connected to a plurality of edge routers 7 to 9 of the provider, usually referred to as provider edge (PE) routers. The provider edge routers 7 to 9 provide the interface between the provider network 2 and the client sites 3 to 5. The client sites have client edge routers 10 to 13 connected by any appropriate means to the provider edge routers 7 to 9.

The manager 6 includes a database 20 of the policy information base (PIB) type. The database 20 uses an appropriate format for sending its data in accordance with a COPS-PR protocol. In particular, it is necessary to comply with IETF recommendation RFC 3159 or with the SPPI standard for structuring the content of the PIB database 20. The database 20 contains information on the configuration of one or more virtual private networks. The virtual private network configuration information contained in the PIB database 20 includes parameters relating to the client sites 10 to 13 and parameters relating to the provider edge routers 7 to 9. These parameters are defined in particular in recommendation RFC 2547bis. The client site parameters include lists of export/import routing targets, source sites for updating BGP routing tables, lists for filtering updates using route distinguishers (RD) and RD-based filters, or lists of filters applying filtering based on the sites of origin, known as SO-based filters. The parameters tied to provider routers include the configuration of the routing tables, route distinguisher (RD) configurations, on the basis of which an access provider edge router assigns a route distinguisher to each site for each route, and configurations of filtering laws in relation to messages received from the network, known as outbound filtering rules. The database 20 can be stored on any appropriate medium, such as on hard disk or in RAM.

The database 20 communicates over an appropriate link with a COPS-PR protocol engine 21 that generates packets containing configuration information for a virtual private network extracted from the database 20. The packets are sent via an output interface 22 of the manager interface to a provider edge router. That output interface 22 communicates with the protocol engine by 21 any appropriate means known in the art.

The destination routers use the configuration information contained in the packets to modify or create a virtual private network configuration. Accordingly the provider edge routers 7 to 9 have an input interface connected by any appropriate means to the output interface 22 of the manager device. The edge routers also include a COPS-PR protocol engine connected to the input interface and adapted to process COPS-PR packets received at the input interface. The COPS-PR protocol engine communicates via an appropriate link with a PIB database of the router. The configuration information coming from the manager device is transmitted and stored in the PIB database of the router. The configuration of the router therefore includes a step of modifying configuration information in its PIB. The configuration of the virtual private network implementing the router is then modified. The PIB of the router 8 can be modified so that routing to site 4 is via router 12 instead of router 11, for example.

Although the structure of service provider edge routers and communication of the manager 6 using those routers has been described so far, client edge routers having the same structure or client end routers managed in a similar way by the manager 6 of the service provider can also be envisaged.

Using the COPS-PR protocol to transmit configuration information for a virtual private network has a number of advantages.

Firstly, a command to modify the configuration imposed on an edge router by the manager device is transmitted in the form of a transaction. Accordingly, the configuration information is transmitted in a single block containing one or more packets. The configuration granularity is adapted to rule type configurations as for VPNs. Thus when the router has received the whole of a configuration information block, it determines if it has received all the configuration information and it is sufficient for it to apply that information for the virtual private network configurations to be taken into account. All the parameters that form the rule are installed. Thus the COPS-PR protocol has a transactional aspect. In the event of a problem with one of the parameters, none of the parameters is installed. Virtual private network configurations can therefore be taken into account virtually in real time by the service provider network. In contrast, other protocols have a weaker granularity that results in configuration information being parceled into a plurality of blocks. It is then not possible to apply the information from only one block, and application is therefore not transactional. [lacuna] not to take into account network service modifications.

Secondly, the use of the COPS-PR protocol presupposes that an edge router is connected to a single network service manager device. Thus the edge router does not receive conflicting virtual private network configuration information from different network manager devices. This improves the reliability of the configuration installed on an edge router. Because of this improved reliability, it is not essential to use regular VPN configuration verification applications. Moreover, the connection of an edge router to a single network service device enables the network service manager device to detect and repair a fault in the edge router much more quickly. An edge router and its associated manager device can therefore regularly share status information to predict failures. Thus the manager device can update its PIB 20 at regular intervals to take account of the latest status of an edge router. The COPS-PR protocol also has error correcting functions, and error correction is further facilitated by the connection of an edge router to a single network service device.

The manager device 6 can have an interface through which it receives commands to modify a virtual private network. Because of the short response time between the sending of configuration information by the manager device and the taking of that information into account by an edge router, it is possible to offer virtual private network modification services to a client practically in real time. For example, the client can connect to a network manager device 6 using any kind of signaling. For example, the client can request the server to include the site 5 in a virtual private network that previously included only the sites 3 and 4. The PIB databases 20 of the manager device 6 are then modified appropriately. COPS-PR packets containing the appropriate configuration for each PIB database are then sent to the routers 7 to 9. After receiving and processing the packets, the routers 7 to 9 modify their configuration for the virtual private network. The routers 7 to 9 then generate the data streams within a VPN in a manner that is known in the art. The virtual private network service can thereby acquire a flexibility of modification unknown until now. The modifications of a VPN service offered to clients can include creating a new VPN, adding a site to an existing VPN, or adjusting the filtering parameters of an existing VPN, for example.

An edge router further has a protocol engine able to generate COPS-PR packets. Accordingly, at the time of the initial connection of a new edge router to a manager device, or of updating a connection, the router can transmit COPS-PR packets specifying its parameters, such as the number of routing instances supported, its stream splitting capacities, etc. When the router is originally connected, or when its connection is updated, it can also transmit information concerning the VPN to which it belongs. The protocol engine generating COPS-PR packets is subordinate to the centralized processing protocol engine 21 in the manager 6.

The embodiments and examples given herein are to be considered as illustrative and non-restricting examples and the invention is not to be understood as limited to the details provided herein, but open to modifications within the scope of the appended claims. Thus in the context of the invention it is possible to use any appropriate transmission means between the provider edge routers, the client edge routers and the network service manager device. Moreover, although the embodiment described applies to the network of the service provider, applying the invention to the sites of the clients of the virtual private network service can equally well be envisaged. Thus it is possible to envisage modifying the virtual private network by transmitting configuration information in accordance with the COPS-PR protocol between a manager device and an edge router of the client site.

The invention claimed is:

1. A network service manager device, comprising:
a PIB database storing configuration information on a storage device, the configuration information for modifying a physical structure of a virtual private network by adding a router to the virtual private network;
a protocol engine configured to generate COPS-PR format network service management packets including configuration information, extracted from the PIB database, for modifying the physical structure of the virtual private network by adding the router to the virtual private network; and
an output interface for sending a command for modifying the physical structure of the virtual private network by adding the router to the virtual private network, the command comprising the COPS-PR format network service management packets including the configuration information, wherein all of the configuration information of the command is sent to the router as a single transaction block using a COPS-PR protocol.

2. The network service manager device of claim 1, wherein the output interface is further for sending all configuration information of the command to the router as the single transaction block using the COPS-PR protocol, such that the router determines that all the configuration information is received before the router installs the configuration information.

3. A virtual private network router, comprising:
an input interface;
a protocol engine connected to the input interface and configured to process a command for modifying a physical structure of a virtual private network by adding a router to the virtual private network, the command comprising COPS-PR packets including configuration information for modifying the physical structure of the virtual private network by adding the router to the virtual private network, wherein all of the configuration information of the command is received at the input interface as a single transaction block using a COPS-PR protocol; and
a PIB database adapted to store configuration information from the protocol engine on a storage device, the configuration information for modifying the physical structure of the virtual private network by adding the router to the virtual private network.

4. The virtual private network router of claim 3, wherein the protocol engine is further configured to generate the COPS-PR packets, and the virtual private network router further comprises:
an output interface for sending the COPS-PR packets supplied by the protocol engine.

5. A network service management system, comprising:
a service provider network comprising:
a network service manager device comprising:
a PIB database storing configuration information on a storage device, the configuration information for modifying a physical structure of a virtual private network by adding a router to the virtual private network;
a protocol engine configured to generate COPS-PR format network service management packets including the configuration information extracted from the PIB database; and
an output interface for sending a command for modifying the physical structure of the virtual private network by adding the router to the virtual private network, the command comprising the COPS-PR format network service management packets including the configuration information, wherein all of the configuration information of the command is sent to the router as a single transaction block using a COPS-PR protocol; and
a plurality of routers, each respective router including:
an input interface;
a protocol engine connected to the input interface and configured to process the command, wherein all of the configuration information of the command is received at the input interface as the single transaction block; and
a PIB database adapted to receive, from the protocol engine, the configuration information for modifying the physical structure of the virtual private network by adding the router to the virtual private network,
wherein each of the plurality of routers is configured to receive the COPS-PR format network service management packets sent by the network service manager device, and each of the plurality of routers is disposed at an edge of the provider network.

6. The network management system of claim 5, wherein the protocol engine of each of the plurality of routers is configured to generate COPS-PR protocol packets; and
wherein each of the plurality of routers further comprises an output interface for sending COPS-PR packets supplied by the protocol engine.

7. A virtual private network management method, comprising:
sending, from a network service manager device, a command for modifying a physical structure of a virtual private network by adding a router to the virtual private network, the command comprising COPS-PR format network service management packets including configuration information for modifying the physical structure of the virtual private network by adding the router to the virtual private network, wherein all of the configuration information of the command is sent to a receiver router as a single transaction block using a COPS-PR protocol, wherein the COPS-PR format network service management packets are generated by a protocol engine of the network service manager device and the configuration information is extracted from a PIB database of the network services management device;
receiving, at the receiver router, the configuration information;
configuring the receiver router as a function of the configuration information; and
storing the configuration information on a storage device of a PIB database of the receiver router and interpreting the configuration information.

8. The method of claim 7, wherein:
the network service manager device is included in a service provider network; and
the receiver router is an edge router of the service provider network.

9. The method of claim 8, further comprising:
communicating between the receiver router and a router of a client portion of the virtual private network.

10. The method of claim 8, further comprising, prior to sending the configuration information from the network service manager device:
connecting the receiver router to the network service manager device; and
sending from the receiver router to the network service manager device at least one of information regarding a configuration of the receiver router, or information regarding a configuration of the virtual private network to which the receiver router belongs, using the COPS-PR protocol.

11. The method of claim 7, wherein:

the network service manager device is included in a service provider network; and the receiver router is an edge router of a client portion of the virtual private network.

\* \* \* \* \*